(12) United States Patent
Mendis

(10) Patent No.: US 6,571,662 B1
(45) Date of Patent: Jun. 3, 2003

(54) METHOD AND APPARATUS FOR VEHICULAR CONTROL PEDALS

(75) Inventor: Kolita Mendis, Newbury Park, CA (US)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/455,265

(22) Filed: Dec. 6, 1999

(51) Int. Cl.7 .................................................. G05G 1/14
(52) U.S. Cl. ...................... 74/514; 74/560; 73/862.474; 307/10.1
(58) Field of Search .......................... 74/512, 513, 514, 74/560; 73/812, 849, 852, 854, 862.391, 862.42, 862.451, 862.474; 307/9.1, 10.1

(56) References Cited

U.S. PATENT DOCUMENTS

| | | | |
|---|---|---|---|
| 4,009,623 A | 3/1977 | Smith et al. | 74/512 |
| 5,829,317 A | 11/1998 | Vreeken et al. | 74/560 |
| 6,298,746 B1 * | 10/2001 | Shaw | 74/512 |

FOREIGN PATENT DOCUMENTS

| | | | | |
|---|---|---|---|---|
| CA | 2146839 A | * | 10/1996 | ........... G06K/11/18 |
| DE | 4340633 A1 | | 11/1993 | |
| DE | 4409235 A1 | | 3/1994 | |
| DE | 4417216 A1 | | 5/1994 | |
| EP | 322785 B1 | | 12/1988 | |
| EP | 657319 B1 | | 12/1994 | |
| EP | 830989 A1 | | 8/1997 | |

* cited by examiner

Primary Examiner—Chong H. Kim
(74) Attorney, Agent, or Firm—Howrey Simon Arnold & White LLP

(57) ABSTRACT

A control pedal unit for a vehicle having a support structure, a pedal connected to the support structure and a detection mechanism responsive to movement of the pedal for generating a signal corresponding to the position or change of position of the pedal. The pedal is formed as a resilient body that is supported by the support structure and the detection mechanism is adapted to generate a signal corresponding to a degree of flexure or change of degree of flexure of the pedal for controlling an operation of the vehicle.

24 Claims, 7 Drawing Sheets

METHOD AND APPARATUS FOR VEHICULAR CONTROL PEDALS

DESCRIPTION

1. Technical Field

The invention relates to a control pedal unit for a vehicle such as an accelerator, brake, clutch or other type of foot control pedal. In particular, the invention relates to a control pedal unit in which it is desired to eliminate the conventional return means, such as a return spring, that biases the pedal toward its unloaded or non-depressed state. In another aspect, the invention relates to a control pedal unit for a vehicle which decreases the risk of foot injury to the driver in an accident. The invention furthermore relates to a support structure for housing at least two control pedal units having the characteristics described above, as well as a vehicle that includes such a control pedal unit. Method and apparatus for sensing the position and change in position of a control pedal unit is also included for purposes of controlling the vehicle.

2. Background Art

Conventional vehicular brake systems typically include a pivotally hinged lever constituting a pedal. The lever is attached to a push rod that actuates a piston housed in a master cylinder. The piston is biased toward an unactuated or non-depressed position by a master cylinder return spring. The master cylinder return spring therefore also returns the pedal to its non-depressed position when a driver releases pressure on the pedal.

Accelerator pedal units are known for automotive vehicles that incorporate electronic engine management systems for which a pedal position sensor determines the degree of depression of the accelerator pedal. Such accelerator pedal units furthermore include a return spring for returning the pedal to a rest position when released after being depressed by a driver. In operation, the sensor controls the vehicle's power plant if the return spring breaks or malfunctions. An example of such a system is found in EP 322,785.

Other known mechanisms associated with vehicle control pedals include U.S. Pat. No. 4,009,623 that relates to a foot lever construction having controlled flexibility. The flexibility is provided for reducing the negative effect when over-exerting forces are applied to the lever due to excitement of the driver under racing conditions. A foot pedal linkage is disclosed in EP 830,989 that is arranged between a push rod connected to the pedal arm and which provides a break-away feature for, in the event of an accident, releasing the connection between the push rod and the pedal arm. This countermeasure prevents the push rod from pushing the pedal arm further into the passenger compartment during an accident thereby reducing the risk of foot injury to the driver. In DE 4340633, a link mechanism retracts the pedals in the case of an accident. This countermeasure reduces the risk of foot injury for the driver when the driver is forced in the forward direction of the vehicle.

Each of the above mentioned disclosures make use of traditional control pedal designs where a pedal is arranged as a rigid lever arm that is pivotally attached upon a support structure. The pedal is returned to its rest position by a return spring that acts either directly or indirectly on the lever. The use of such systems are particularly vulnerable when a position sensor is used for determining the degree of desired acceleration if the spring breaks as indicated in EP 322,785.

Furthermore, by arranging a control pedal unit as a pedal positioned on a lever protruding into the compartment of the vehicle, the risk of foot injury is increased for several reasons. If a traditional linkage that includes push rods is used, the pedals can, in the case of an accident, be forced into the passenger compartment with considerable force resulting in foot injury to the driver. If a device according to EP 830,989 is used, this risk may be reduced or eliminated, but foot injuries can still occur if a foot of the driver twists against the pedal when he or she is forced in the forward direction of the vehicle. A possible result of the driver being forced in the forward direction while the foot remains on such a pedal is that the foot is twisted either backwards or sideways, or in both directions. The reason for such twisting is that the pedal does not give adequate support for the foot and because the pedal is protruding into the passenger compartment. Thus, it is possible that a part of the foot will remain on the pedal in the case of an accident, while another part is forced forward without any support.

In view of the above described deficiencies associated with known foot pedal support designs, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed foot pedal support arrangements and incorporates several additionally beneficial features. Such features include providing a control pedal unit in which the pedal itself is formed as a resilient body thereby establishing a pedal unit in which the need for a separate return spring is eliminated. Safety is also increased because the dimensions and stability of the pedal of the present invention eliminates the risk of return spring failure. If an accident should occur in which the driver is forced towards the pedal arrangement, the resiliency of the pedal functions as a deceleration mechanism that decelerates the foot and lower leg portion of the driver in a controlled manner.

In another aspect, by providing a control pedal which includes a support structure having a lower support member and an upper support member, it is possible to establish a foot pedal that gives a driver's foot full support from the heel to the toes. Furthermore, the design of the present invention makes it possible to construct a pedal arrangement in which undesirable projection into the passenger compartment by the arrangement is essentially eliminated. Instead, the pedal arrangement defines a continuous curved surface. This construction reduces the risk of twisting the driver's foot in the event of an accident.

By providing a control pedal unit where the resilient body is pivotally attached to a support structure at one or both of its top and/or bottom ends, it is possible to create a pedal with sufficient operating resiliency, while also reducing the total length of the pedal. This is advantageous due to the lack of space in the feet receiving area or compartment of a vehicle.

By providing a control pedal unit where the resilient body is rigidly attached to the support structure, it is possible to create a resilient pedal supported only at one end. Such a pedal might give an appearance that reminds one of a traditional pedal design, but maintains the benefit of being itself of resilient construction which, in the case of an accident, will reduce the risk for foot injury in the ways described herein.

By providing a curved resilient body that is convexly arranged toward the driver when mounted in the vehicle, it is possible to create a pedal unit that has adequate flexure under those loads experienced during both normal and accident conditions.

By providing a flexible and symmetrical pedal body in which a bulge of the resilient convex body performs a linear displacement perpendicular to a plane including the points where the flexible body is attached to the support structure, further beneficial performance is achieved.

By making the resilient body with one bulge, an advantage of symmetry is obtained while maintaining a simple and appealing structure.

By making the flexible link so that flexure of the link increases with increasing load thereupon, a stable structure is created in which the driver is not surprised by erratic behavior of the pedal.

The use of a resilient body as a vehicular control pedal structure is particularly suited when a strain gage is employed as means for measuring or indicating the pedal's position or condition. If a conventional pedal construction is used, the pedal position cannot be directly indicated by a strain gage. Instead, the conventional pedal must be arranged to bend a separate body whose degree of flexure may in turn be measured by a strain gage. The use of the resilient body of the present invention, together with a strain gage, renders possible a simple, reliable pedal arrangement that further includes the benefits of resiliency in a crash situation.

In another embodiment, a support structure is utilized that houses pedal units. By arranging two or more pedals so that a continuous pressing surface is created thereby, the risk for sideways twist of the foot of the driver is reduced in the case of an accident. By additionally providing means for preventing access to underneath the continuous engagement surface when an adjacent pedal is depressed, the safety aspects of the pedal assembly in an accident situation are further improved. The need for such a prophylactic against foot access underneath a foot pedal has been learned from situations in which a driver's foot has been injured when projected underneath a conventionally designed pedal assembly in an accident.

By making the unactuated position of the pedal structure adjustable, it can easily be adapted to drivers of different height, thereby reducing the need for a shorter driver to be positioned in an excessively low position which can be detrimental to sight conditions for that driver.

The beneficial effects described above apply generally to the exemplary devices and mechanisms disclosed herein for a resiliently constructed vehicle control pedal. The specific structures through which these benefits are delivered, however, will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details that are disclosed herein are not to be interpreted as limiting, but merely as a basis for the claims and as a representative basis for teaching one skilled in the art to variously employ the present invention.

Figure 1:
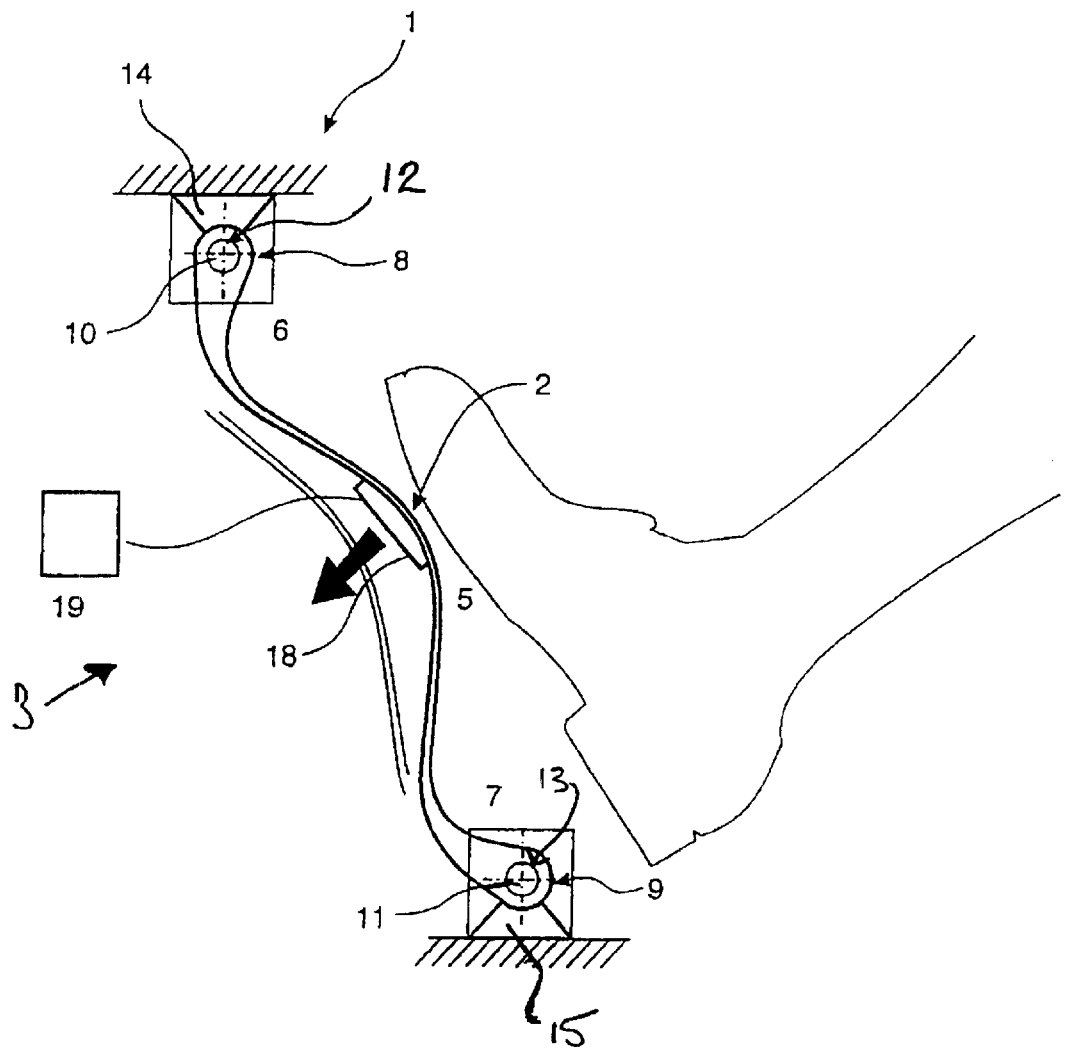
FIG. 1 is a side view of a control pedal unit constructed according to one embodiment of the present invention.

Referring to the figures, FIG. 1 shows a side view of a control pedal unit for a vehicle comprising a support structure 1, a pedal or surface 2 connected to said support structure 1 and a sensor mechanism 3 responsive to the movement of the pedal 2 or strain induced therein for generating a signal corresponding to the position, change of position or strain induced in the pedal 2.

The pedal 2 is formed as a resilient body. The body establishes essentially a shaped resilient surface 2 having a width dimension and a length dimension that are considerably greater than the thickness of the body. As shown in the side views, the surface 2 is curved and has a mid-portion 5, a first end portion 6 and a second end portion 7. Connections 8,9 are provided for securing the surface 2 to the support structure 1 at the first 6 and second 7 end portions. In a preferred embodiment, each of the connections 8,9 incorporate pins 10,11, respectively, that are inserted into holes extending through mountings on the support structure 1 for securing the pedal 2 at the first 6 and second 7 end portions thereof. In this manner, the surface 2 is pivotally arranged at both end portions, thereby giving the mounted surface reduced resistance to bending while maintaining the thickness of the surface 2. Alternatively, the end portions 6,7 may be fixed to the support structure 1 so that differing amounts of strain are induced in the pedal or surface 2 depending upon the amount of depressing force applied thereupon.

Due to the fact that the surface 2 is curved in the preferred embodiment, it forms a bulge or a number of bulges. The surface 2 in FIG. 1 has one bulge facing the direction of the driver when mounted in the vehicle. The bulge is predominantly distributed over the mid-portion 5 of the surface 2. By placing the bulge centrally between the two support connections 8,9, and making the surface 2 symmetrical, the mid-portion 5 of the pedal 2 will undergo a linear motion transverse to a plane passing through the connections 8,9.

From a plan view over the pedal assembly, the surface 2 preferably has a rectangular shape. A preferable width ranges from 12 to 16 cm. The length, size and shape of the surface 2 is selected for positioning the bulge in the mid-portion of the surface 2 and in a comfortable position beneath the sole of a driver's foot wearing normal sized shoes. The length is also adapted for giving the surface 2 correct resiliency. The length of the surface 2 preferably ranges from 25 to 45 cm.

The thickness of the pedal or surface 2 is selected to give the surface 2 the desired resiliency, while also making the surface 2 sufficiently sturdy to endure repetitive flexing during the operative life of the carrying vehicle. The thickness of the surface 2 preferably ranges from 1 to 5 mm and the pedal 2 may be corrugated to increase the structure's flexibility.

The surface 2 is preferably made of a plastic material which might be reinforced by fibers. The material should have sufficient fatigue strength to withstand repeated pedal applications during the intended useable lifetime thereof. Typical materials would be acetal polymers with a Young's modulus in the range of 1 GPa to 7 GPa.

In the end portions of the surface 2 are bores 12,13 provided for accommodating the pivot connections 10,11. The surface 2 might be reinforced in the region of the bores 12,13 by the inclusion of reinforcement fibers, by making the surface 2 thicker in this area, or by other suitable strengthening measures.

The surface 2 is carried upon the support structure 1. The support structure 1 includes an upper and a lower connection assemblies. The upper and lower connection assemblies each include a retaining mechanism 14,15 adapted to form respective pivot connections 8,9. The retaining mechanisms 14,15 are formed as flanges including bores that receive the pivot pins 10,11. When mounting the surface 2 to the support structures, the surface 2 is positioned on the support structure with the bores 12,13 in the ends of the surface 2 aligned with the bores of the flanges 14,15. The pins 10,11 are then inserted through the aligned bores and secured to the flanges 14,15. The pins 10,11 can be secured in any conventional way; for instance, by forming the pivots using bolts as the pins 10,11 which are secured by nuts when mounted in the bracket formed by the flanges 14,15.

In an alternative embodiment, the surface 2 may be shaped with conventionally designed snap locks in the end regions thereof. The provision of a partly open bore forms such a snap lock. The width of the opening is less than the diameter of the pivot, but the surface can still be forced upon the pivot.

The surface is furthermore provided with a movement responsive mechanism 3 that senses movement of the pedal 2 and generates a signal corresponding to the position and/or change of position of the pedal 2. In FIG. 1, the mechanism 3 includes a strain gage 18 that is mounted on the surface 2. The strain gage 18 generates a signal that is dependent on the amount of flexure of the pedal 2. The signal is evaluated by a processor 19 which controls a chosen function of the vehicle such as the brake system, the required power output of the engine or any other system controlled through a pedal.

Figure 2:
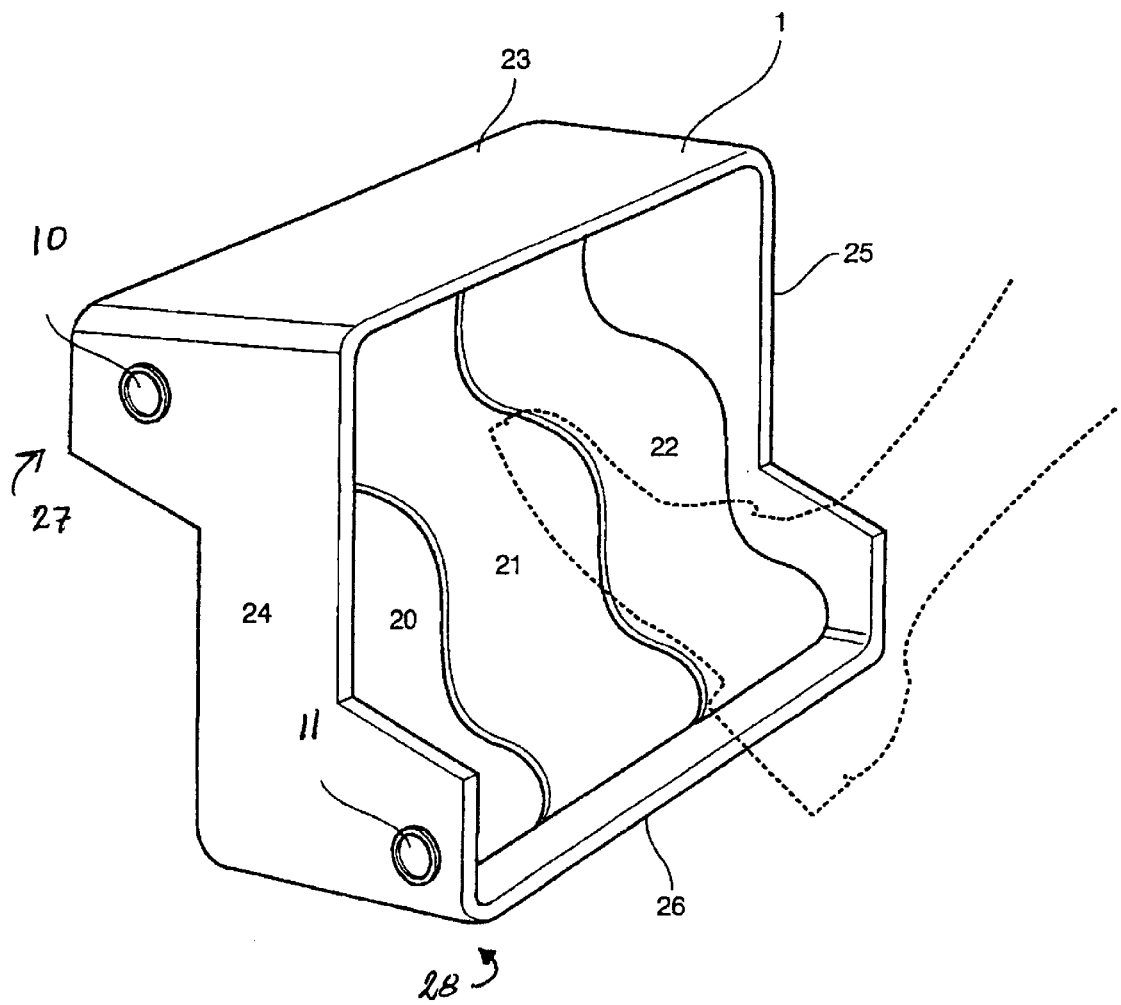
FIG. 2 is a perspective view of a pedal cluster including three pedal units.

The support structure is preferably made as a support frame as exemplarily shown in FIG. 2. FIG. 2 further indicates a cluster of three pedals 20,21,22. The pedals are intended to function as an accelerator pedal, a brake pedal and a clutch pedal. The cluster of pedals are housed in a support structure 1 shaped as a support frame. The support frame 1 includes a top wall 23, two side walls 24,25 and a bottom wall 26. The several walls are connected together to form a partially closed box shaped structure. If extra rigidity is required, a back wall may be added leaving only a front opening in the box shaped structure. The two pivot assemblies 10,11 are arranged and secured at the side walls 24,25. The pivot assemblies 10,11 carry the three pedals 20,21,22. The pivots assemblies 10,11, together with the box shaped structure, create a very rigid frame that protects the feet in case of a side collision. The box, when mounted in a vehicle, may also be connected to the frame structure at both sides of the vehicle via a rigid structure thereby increasing side impact protection for the vehicle.

The first pivot 10 is arranged in an upper part of the support structure 1 and forms an upper support member and the second pivot 11 is arranged in the lower part of the support structure and forms a lower support member. As shown, the first pivot 10 is arranged in a back portion 27 of the support structure 1 and the second pivot 11 is arranged in a front portion 28 of the support structure 1. This arrangement provides for an inclination of the pedal in relation to the box shaped support structure 1. When mounted in a vehicle, the fixation of the box shaped support structure 1 and the inclination of the pedal within the support structure 1 is chosen so that an inclination angle in relation to a horizontal plane in the vehicle is preferably in the range of 15°–60°.

As shown in FIG. 2, the three pedals together form a substantially continuous engageable surface without large gaps therebetween or any protruding elements that are present in conventional pedal designs. In an alternative embodiment, a separating member may be provided to separate neighboring pedal units. In that case, the pedal units, together with the separating member(s) create a surface without any large gaps. The separating member can be made in the same manner as the resilient body of a pedal unit with the only difference being that the separating member is not provided with means for generating a signal responsive to flexure in the separating member. Alternatively, the separating member(s) may be constructed as part of the support structure. In preferred embodiments, the separating member has a similar or same curvature as the pedals.

In a preferred embodiment, the separating member is formed with a resistance to flexure that is greater than the resistance to flexure of the neighboring pedals. This reduces the risk of a driver pushing the separating member instead of a pedal by mistake. If the separating member is provided with a reenforcing structure that deforms under loads occurring in a collision situation, a structure that avoids the driver erroneously pushing the separating member is provided while still having the benefits of resilient operation.

Figure 3:
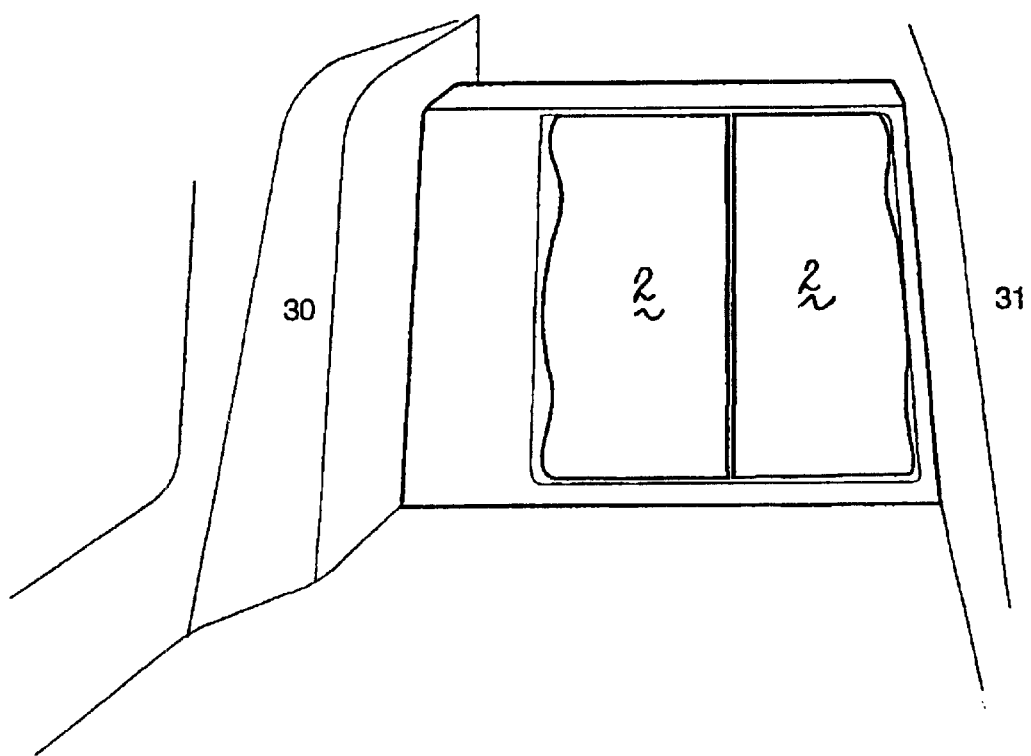
FIG. 3 is a perspective view of a support structure housing two pedal units and in which the support structure is mounted in a frame.

FIG. 3 shows a perspective view of a pedal frame together with two pedals 2 mounted in a vehicle. The width of the pedal frame is chosen so that the pedal frame fills the complete space between an outer wall 30 of the vehicle and the hump 31 separating the driver's feet compartment from the passenger's feet compartment. This can increase the rigidity of the vehicle and thereby side impact safety. It also eliminates gaps large enough for feet to slide thereinto.

Figure 4:
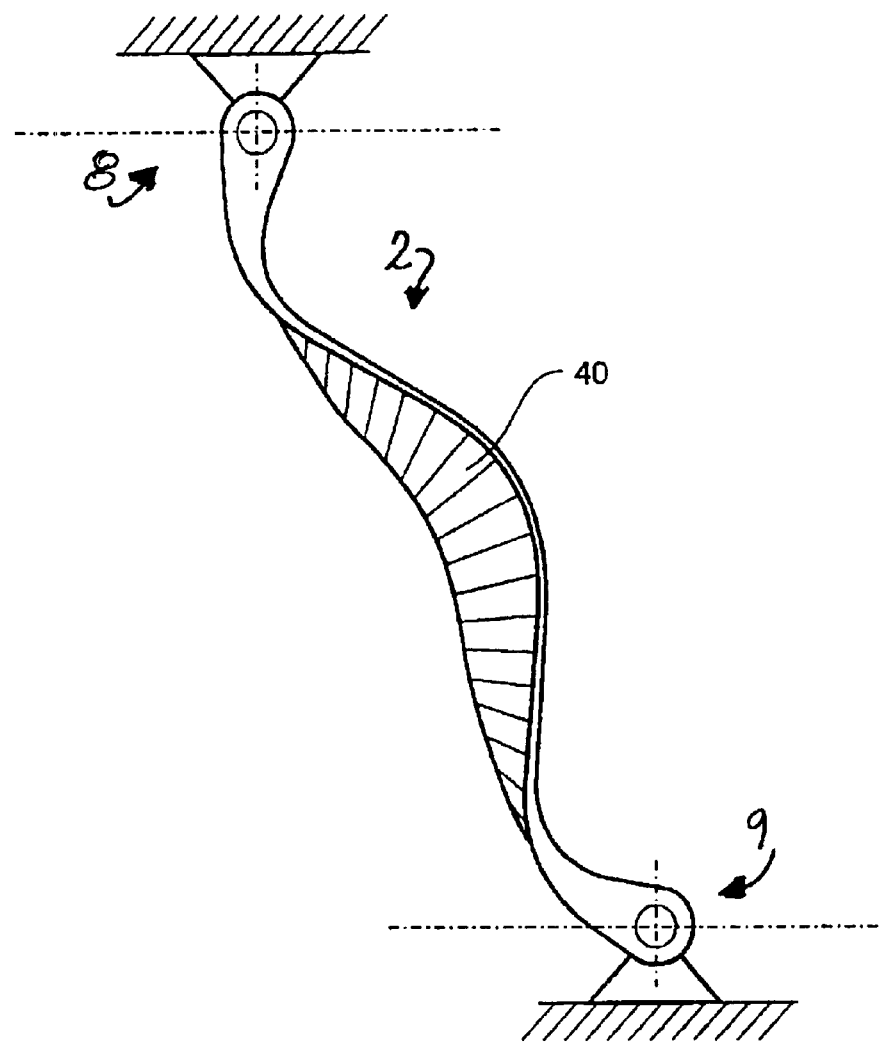
FIG. 4 is a side view of a pedal including a side wall for preventing access to the space underneath that pedal when a neighboring pedal is depressed by the driver.

FIG. 4 shows a side view of a pedal surface 2 having a side portion 40 for preventing access underneath an adjacent pedal when that neighboring pedal is depressed. The side portion 40 can be made of elastomeric, foam or other suitable material that is attached to the backside of the surface. It can also be constituted by an open comb filler. If a separating member is used, the access barrier is preferably provided on the separating member.

Figure 5A:
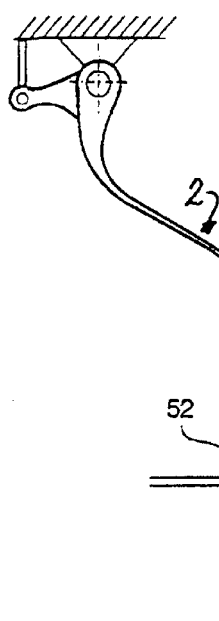
FIGS. 5a–5f are side views of pedal units having different mechanisms or means for detecting the degree of flexure or change in position of the pedal.
Figure 5B:
Figure 5C:
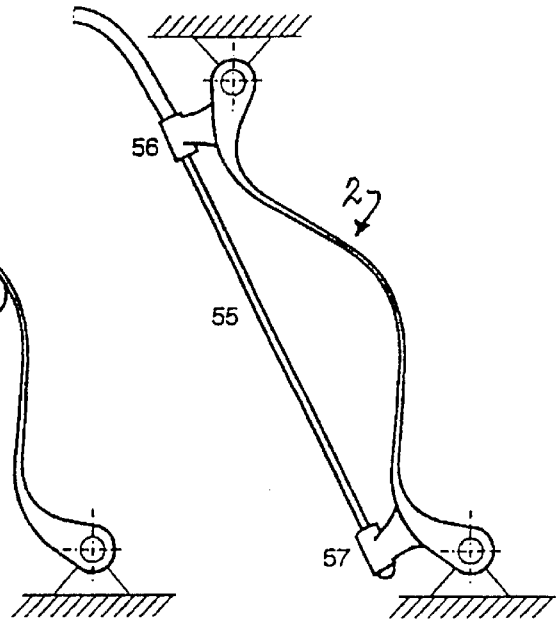

FIGS. 5(a)–5(f) illustrate different examples of suitable mechanisms for generating a signal corresponding to the degree of flexure of the pedal 2. FIG. 5a shows a linkage that is connected to the resilient surface 2. When the surface 2 is actuated, the link will follow the movement of the point 52 of the surface where the link is attached to the surface. FIG. 5b shows a cam 53 that is mounted for following the movement of the surface. The motion of the cam 53 can be measured by a rotational sensor 54. The cam 53 may constitute a conventional brake, clutch or accelerator lever arm, in which case the resilient pedal surface 2 serves as a protective cover over a conventional pedal assembly. FIG.

Figure 5D:
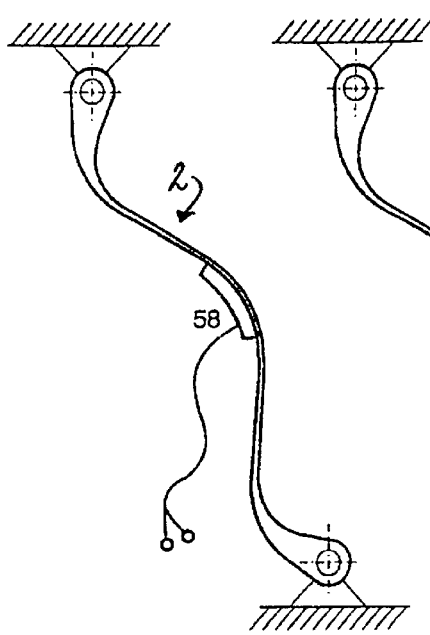
Figures 5E, 5F:
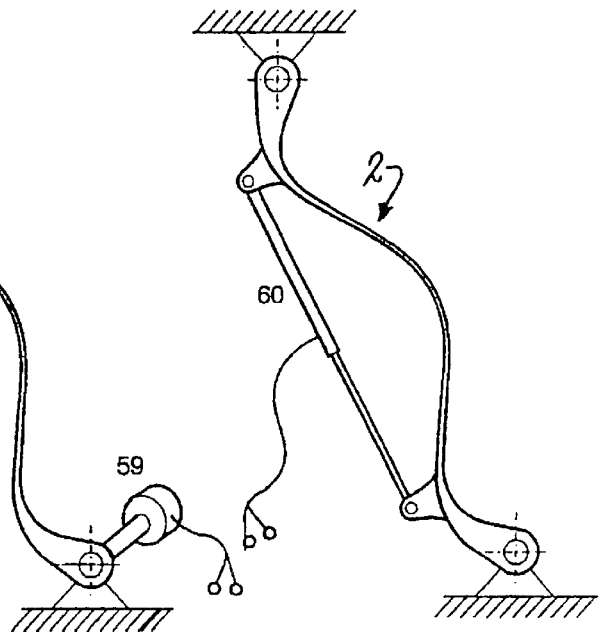

5c shows a cable 55 attached at an upper portion 56 of the surface and a lower portion 56 of the surface. When the surface is actuated, the distance between the points of connection of the cable is changed. Thereby, the cable functions as a mechanism for generating a signal that corresponds to the degree of flexure of the surface. FIG. 5d illustrates a strain gage 58 attached to the surface 2. When the surface 2 flexes, a signal is generated that corresponds to the degree of flexure of the surface 2. FIG. 5e shows a rotary sensor 58 attached in the vicinity of a pivot 59 of the resilient surface 2. When the surface 2 is actuated, the portion around the pivot 59 rotates and the rotary sensor 58 functions to generate a signal that corresponds to the degree of flexure of the surface 2. FIG. 5f shows a linear sensor 60 that is attached and functions in a similar manner to the cable shown in FIG. 5c.

Figure 6A:
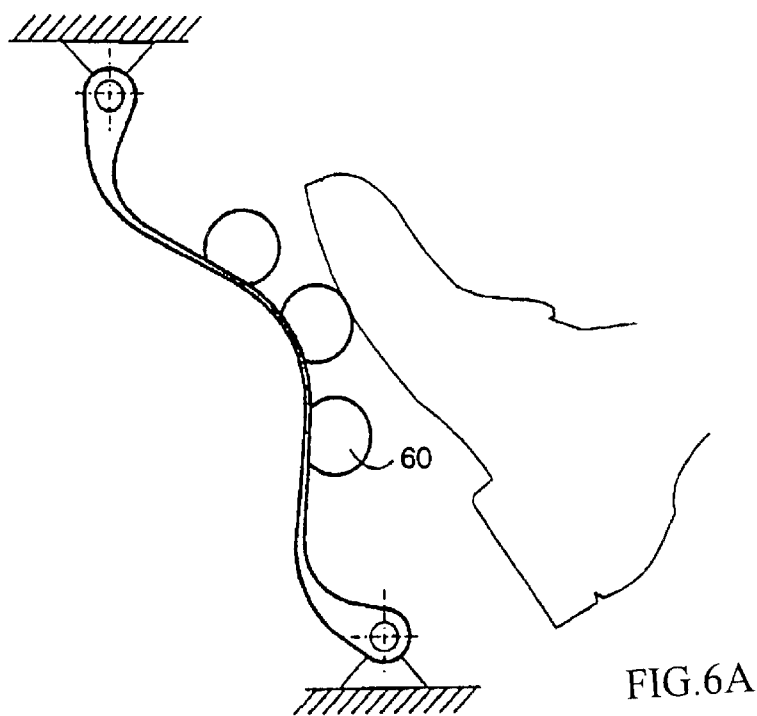
FIGS. 6a–6b are side views of pedal units having added ergonomic comfort features.
Figure 6B:
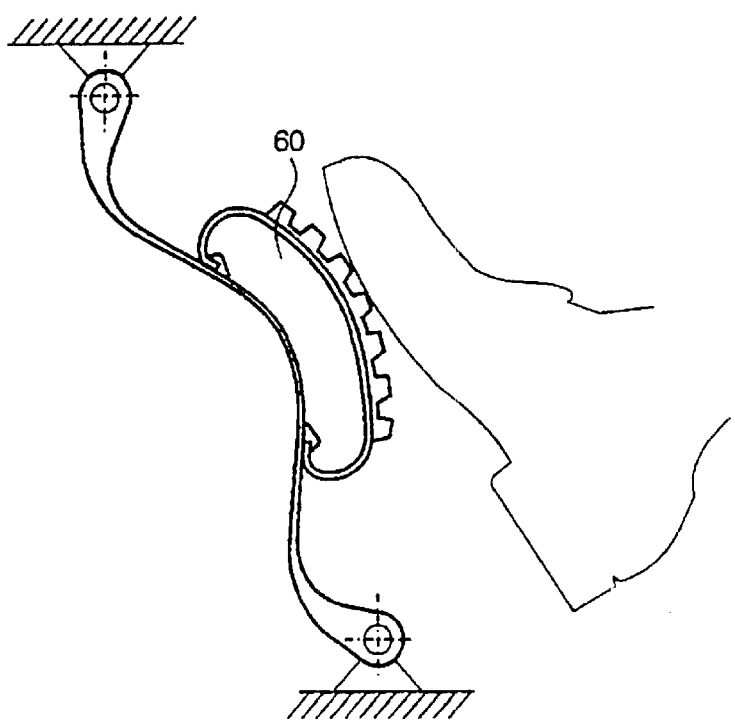

In FIGS. 6a–6b, a pedal surface 2 is shown which carries two variants of ergonomic add-on comfort structures 60.

Figure 7A:
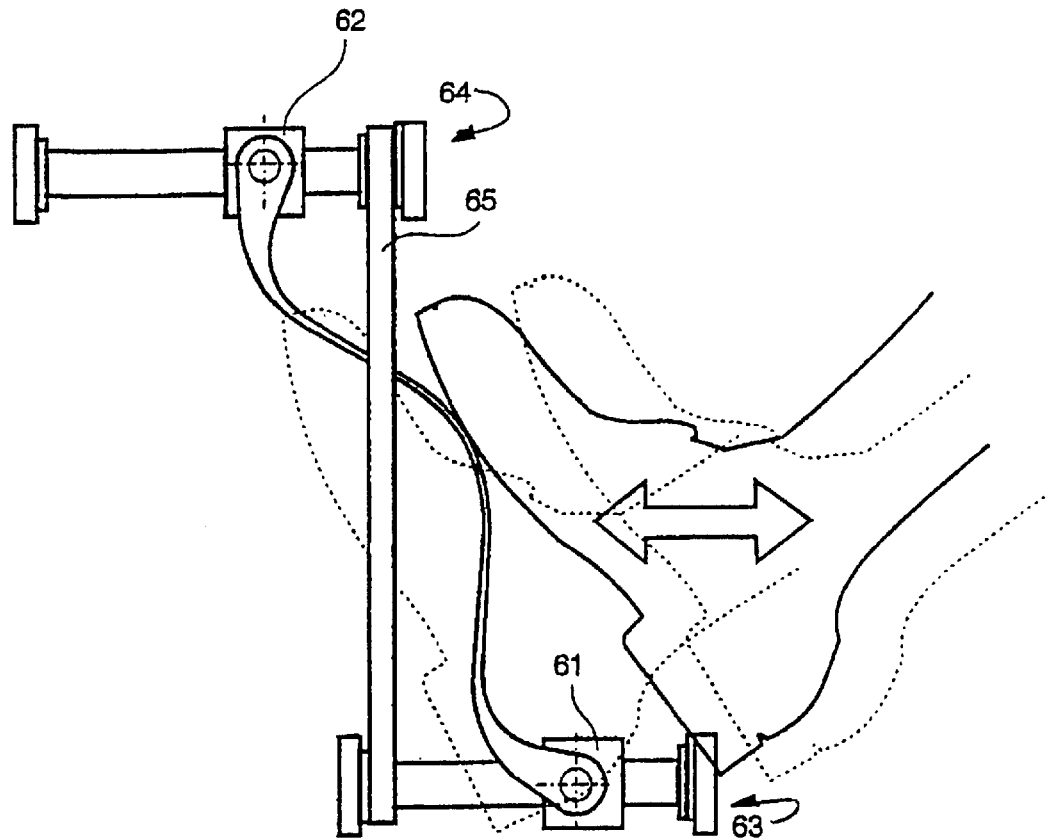
FIGS. 7a–7b show a pedal unit mounted in a frame and having a means for adjusting the configuration of the pedal.
Figure 7B:
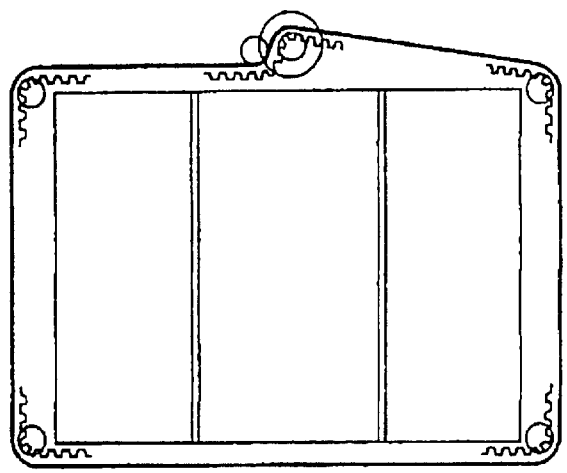

As shown in FIGS. 7a–7b, it is possible to arrange the pedal units adjustably within a frame so that the position of the pedal can be adapted to the height of the driver. This can be accomplished by mounting the upper and lower members 61,62 of the support structure to worm screws 63 and 64. The two screws can be driven individually or by a belt 65, which in turn is rotated manually or by a motor as illustrated in FIG. 7b. The belt 65 gives the two screws 63,64 equal rotational velocity, thereby making it possible to move the mounting locations for the pedal along the axis of said screws. The entire frame could also be rotated about a revolute joint positioned above the frame thus adjusting pedal proximity to the driver.

The invention is not limited to the above-mentioned embodiments, but may be varied within the scope of the claims. For example, the resilient body might be supported only at one of its ends and have the other end free. Such a pedal is reminiscent of a traditional pedal configuration. The principle of generating a signal that corresponds to the flexure of the pedal would, however, remain. If such a pedal is used, the resilient body will normally be rigidly attached at the supported end. Furthermore, a pedal unit could be arranged in which one end is rigidly or pivotally supported while the other end is resting on a support. Material other than plastic may be used in the construction of the resilient member; for instance, spring steel. Alternatively, it may be made of segments containing rigid and resilient materials in combination. All of the disclosed embodiments of the invention can be provided with a compliant travel stop which may be incorporated under the flexible element to withstand high pedal loads that are beyond the load bearing capacity of the flexible element alone.

A flexible control pedal for a vehicle and its constituent components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the vehicular industries.

What is claimed and desired to be secured by Letters Patent is as follows:

1. A control pedal unit for a vehicle comprising:
   at least two adjacently positioned pedals connected to a support structure;
   a detention mechanism responsive to movement of at least one of said pedals for generating a signal corresponding to the position or change of position of said pedal; and
   said at least one of said pedals being formed as a resilient body supported by said support structure and said detection mechanism being adapted to generate a signal corresponding to a degree of flexure of said pedal for controlling an operation of the vehicle, and said two pedals arranged to from a substantially continuous surface when both pedals are in an undepressed configuration.

2. A control pedal unit for a vehicle according to claim 1 wherein said support structure includes an upper support member and a lower support member and said resilient body is supported by said upper and lower support members whereby said resilient body is arranged to flex under load between said upper and lower support members.

3. A control pedal unit for a vehicle according to claim 2 wherein said resilient body is pivotally attached to said upper support member at a pivot connection.

4. A control pedal unit for a vehicle according to claim 2 wherein said resilient body is pivotally attached al the lower support member.

5. A control pedal unit for a vehicle according to claim 2 wherein said resilient body is pivotally attached at said upper support member.

6. A control pedal unit for a vehicle according to claim 2 wherein said resilient body is rigidly attached at said upper support member.

7. A control pedal unit for a vehicle according to claim 2 wherein said resilient body is rigidly attached at said lower support member.

8. A control pedal unit for a vehicle according to claim 7 wherein said resilient body is rigidly attached at said upper support member.

9. A control pedal unit for a vehicle according to claim 1 wherein said resilient body is curved thereby forming at least one bulge convex toward a driver's direction when mounted in a vehicle.

10. A control pedal unit for a vehicle according to claim 9 wherein said resilient body is symmetrical with respect to said bulge.

11. A control pedal unit for a vehicle according to claim 9 wherein said resilient body has only one bulge.

12. A control pedal unit for a vehicle according to claim 2 wherein flexure of said resilient body increases with an increasing load applied thereupon.

13. A control pedal unit for a vehicle according to claim 11 wherein said detection mechanism responsive to movement of said at least one of said pedals comprises a strain gage attached to said resilient body whereby the degree of flexure of said resilient body is measured by said strain gage.

14. A control pedal unit for a vehicle according to claim 1 wherein said detection mechanism responsive to movement of said at least one of said pedals comprises a rotary sensor attached to said resilient body.

15. A control pedal unit for a vehicle according to claim 3 wherein said detection mechanism responsive to movement of said at least one of said pedals comprises a rotary sensor attached to said resilient body proximate to said pivoting connection between said resilient body and said support structure and whereby depression of said resilient body pivots said resilient body in an area proximate said pivoting connection.

16. A control pedal unit for a vehicle according to claim 1 wherein said detection mechanism responsive to movement of said at least one of said pedals comprises a linear sensor attached to said resilient body at two distant locations and whereby flexure of said resilient body increases the distance between said two distant locations.

17. A control pedal unit for a vehicle according to claim 1 wherein said detection mechanism responsive to movement of said it least one of said pedals comprises a cable attached to said resilient body at two distant locations and whereby flexure of said resilient body increases the distance between said two distant locations.

18. A control pedal unit for a vehicle according to claim 1 wherein said detection mechanism responsive to movement of said at least one of said pedals comprises a cam member and whereby said cam member follows the flexure of said resilient body.

19. A control pedal unit for a vehicle according to claim 1 wherein said detection mechanism responsive to movement of said at least one of said pedals comprises a link mechanism attached to said resilient body.

20. A control pedal unit for a vehicle according to claim 1 further comprising a separating member attached to one of said at least two adjacently positioned pedals, said separating member forming a substantially continuous surface with said at least two adjacently positioned pedals when both pedals are in an undepressed configuration.

21. A control pedal unit for a vehicle according to claim 20 wherein said separating member has a side portion for preventing feet access underneath said one of said at least two adjacently positioned pedals when an adjacent pedal is depressed.

22. A control peal unit for a vehicle according to claim 1 further comprising a separating member attached to each one of said at least two adjacently positioned pedals, each of said separating members having a side portion for preventing feet access underneath said pedals.

23. A control pedal unit for a vehicle according to claim 1 further comprising:
   said support structure mounted in a pedal frame, said pedal frame configured to fill a driver's feet compartment between a side structure and a center tunnel wall of a vehicle and thereby arranging d pedals to create a substantially continuous surface for abuttingly receiving a driver's feet thereupon without protrusions into the driver's feet compartment.

24. A control pedal unit for a vehicle according to claim 23 wherein said support structure is adjustably supported by said frame thereby accommodating varying of said pedals' positions for accommodating drivers of different heights.

* * * * *